Nov. 5, 1963  K. SCHRÖTER ET AL  3,109,506
WALKER-TYPE MOTOR VEHICLE
Filed Nov. 2, 1961  5 Sheets-Sheet 1

Inventors
KURT SCHRÖTER
FRANZ GROSSE-SCHARMANN
By Toulmin & Toulmin
Attorneys

Nov. 5, 1963    K. SCHRÖTER ET AL    3,109,506
WALKER-TYPE MOTOR VEHICLE
Filed Nov. 2, 1961    5 Sheets-Sheet 2

Inventors
KURT SCHRÖTER
FRANZ GROSSE-SCHARMANN
By Toulmin & Toulmin
Attorneys

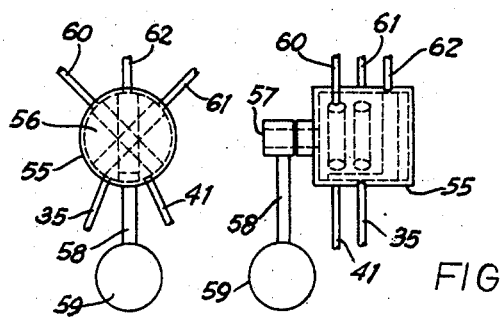
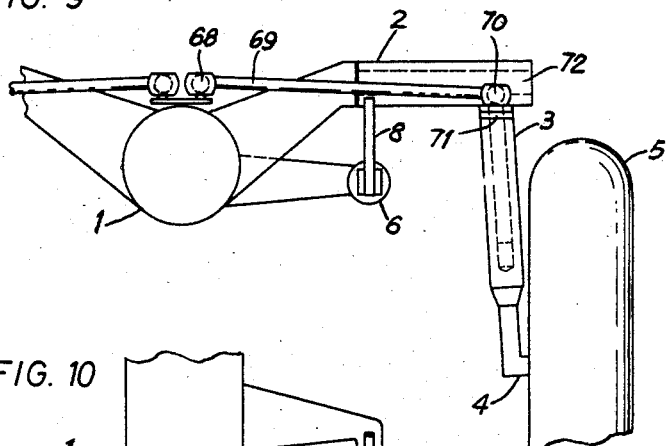
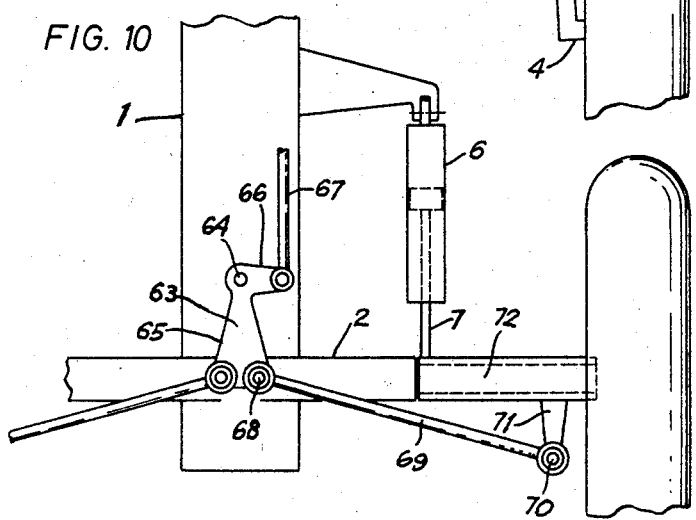

Nov. 5, 1963    K. SCHRÖTER ET AL    3,109,506
WALKER-TYPE MOTOR VEHICLE
Filed Nov. 2, 1961    5 Sheets-Sheet 5

Inventors
KURT SCHRÖTER
FRANZ GROSSE-SCHARMANN
By Toulmin & Toulmin
Attorneys

United States Patent Office 3,109,506
Patented Nov. 5, 1963

3,109,506
WALKER-TYPE MOTOR VEHICLE
Kurt Schröter, Lohmar, near Siegburg, and Franz Grosse-Scharmann, Senden, near Munster, Westphalia, Germany
Filed Nov. 2, 1961, Ser. No. 149,676
Claims priority, application Germany Nov. 4, 1960
13 Claims. (Cl. 180—8)

The present invention relates to a motor vehicle having two propulsion systems which act concurrently, more particularly, to a wheeled vehicle wherein one propulsion system rotates the wheels and a second propulsion system alternately advances and returns the wheels to produce a "walking" action superimposed on the rotary action of the wheels.

Wheeled vehicles which are propelled by rotating the wheels may additionally be propelled by alternately moving the axles of the wheels forwardly and rearwardly with respect to the vehicle body in order to produce a "walking" action by this periodic movement of the wheels. The "walking" action may be superimposed on the rotary action of the wheels so that, in effect, the vehicle has two distinct propulsion systems which may act separately or concurrently. These vehicles are particularly suited for cross-country driving but may also be driven upon roads using only the propulsion system to rotate the wheels.

These vehicles, however, have the disadvantage in that, under certain operating conditions, the additional propulsion force intended to be derived from the "walking" action of the wheels is not obtained since the wheels which are being moved rearwardly with respect to the body roll backwards as a result of the reaction between the road surface and the wheel. Accordingly, moving the wheel axles rearwardly or reverting them does not produce an additional propulsion force on the vehicle with respect to the ground and accordingly the benefits of this "walking" action are not realized.

It is therefore the principal object of this invention to provide a novel and improved motor vehicle having two propulsion systems which can act concurrently so that the vehicle has the benefit of two propulsion effects.

It is a further object of this invention to provide a wheeled vehicle having a motive system to actuate the wheels in a "walking" motion.

It is another object of this invention to provide a "walking" wheeled vehicle wherein the rotation of the wheels is retarded when the wheels are reverted and increased when the wheels are advanced in order to produce an effective "walking" action.

It is an additional object of this invention to provide a novel and improved steering arrangement for a wheeled vehicle of the "walking" type.

The motor vehicle of the present invention essentially comprises a body with a pair of vertical supports with their upper ends being pivotally mounted on the body for pivoting movement about a horizontal axis. Wheels are mounted on the lower ends of the vertical supports. Two hydraulic systems are provided with one hydraulic system rotating the wheels either through individual hydraulic motors mounted on the individual wheels or through some other suitable arrangement. The other hydraulic system actuates two hydraulic cylinders each of which has its pistons connected to the vertical supports. By alternately producing a working and return stroke in the hydraulic cylinders the vertical supports are periodically advanced and reverted to produce a "walking" motion.

In order that the "walking" motion is effective the wheel brakes themselves can be used to retard the rotation of the wheels during the return movement of the vertical supports. As a modification a control valve may be provided in the hydraulic system for rotating the wheels so as to interrupt the return of fluid pressure medium from the wheel which is being reverted so as to retard the rotation of this wheel.

The hydraulic motors of the wheels are connected in parallel in the hydraulic system so that when the rotation of one wheel is retarded, an increased quantity of fluid pressure medium is supplied to the advancing wheel so as to increase the speed thereof. Thus, the increased rotation of the advancing wheel does not interfere with the propelling effect obtained by rotating of the wheel.

Both of the hydraulic systems are connected with control valves to provide for the cyclical retardation of the rotation of the wheel being reverted and for the cyclical reversal of the power stroke of the hydraulic cylinder actuating the vertical support.

The vertical supports may be adjusted to a fixed position so as to vary the wheel base and center gravity of the vehicle to obtain the most favorable combination thereof according to the working conditions encountered.

In addition, hydraulic pressure cylinders may be mounted in the vertical supports so as to be able to vertically position the wheels. With this arrangement the distribution of the load of the individual wheels can be selectively varied.

The steering of the vehicle is effected in one of several different ways. Steering connection rods may be used to rotate the vertical supports about their vertical axes so as to steer the vehicle. In another modification the vertical support and the cylinder for pivoting the vertical support are both mounted on a frame which, in turn, is mounted on the vehicle body for pivoting movement about a vertical axis. Thus, to steer the vehicle it is only necessary to pivot the frames about their vertical axes. This modification has the further advantage in that the "walking" effect is produced in the correct direction even when the vehicle is being steered.

Other objects and advantages of this invention will be apparent upon reference to the accompanying description when taken in conjunction with the following drawings, wherein FIGURE 1 is a side elevational view of a motor vehicle of this invention having a pair of wheels through which propulsion forces are obtained;

FIGURES 8a and 8b are elevational views of a schematic illustration of a slope control device for automatically positioning the vehicle in a horizontal position;

FIGURE 9 is a front elevational view of the vehicle of FIGURE 1 showing the steering linkage;

FIGURE 10 is a top elevational view of the steering linkage shown in FIGURE 9;

A specific embodiment of the present invention together with several modifications thereof will be described in detail with reference to the drawings wherein like reference symbols indicate the same parts throughout the various views.

Figure 1:
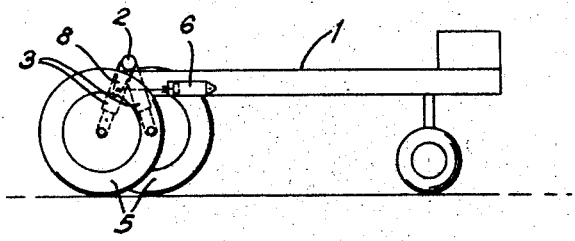
Figure 2:
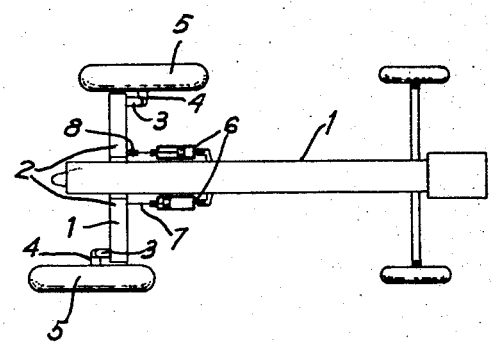
FIGURE 2 is a top plan view of the vehicle illustrated in FIGURE 1.

With particular reference to FIGURES 1 and 2 there is illustrated a motor vehicle according to the present invention having a body illustrated at 1 with a horizontal axle 2 mounted thereon. A pair of vertical supports 3 is pivotally mounted at their upper ends on the outer ends of the horizontal axle 2 so as to be pivotable about a horizontal axis. There are spindles 4 extending horizontally from the lower ends of the vertical supports 3 with wheels 5 being mounted on said spindles.

A pair of hydraulic pressure cylinders 6 having piston rods 7 are fixedly mounted on the vehicle body 1. The piston rods 7 are connected to the respective vertical supports 3 through a suitable linkage, indicated at 8.

Figure 7:
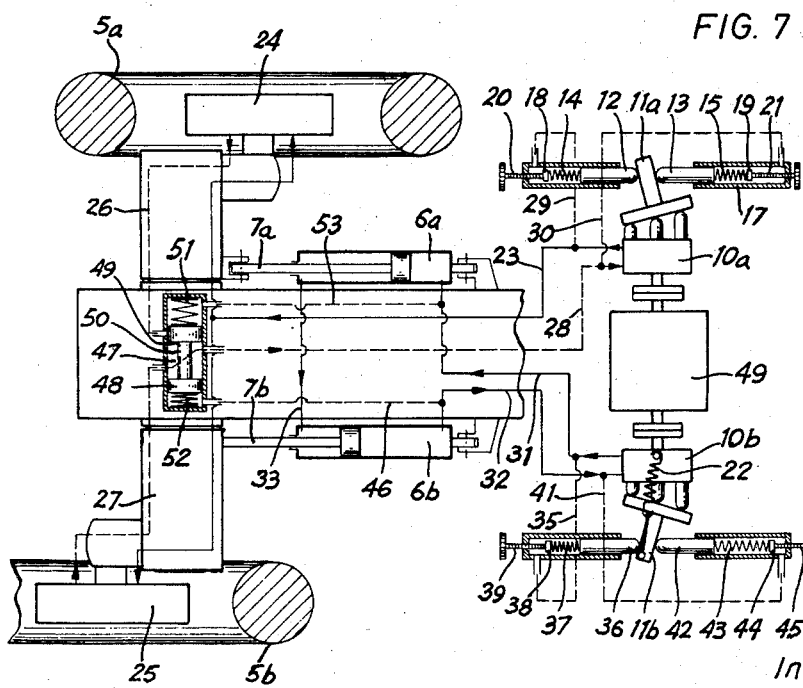
FIGURE 7 is a schematic view of the hydraulic circuits for the vehicle illustrated in FIGURES 1 and 2.

Proceeding next to FIGURE 7, which illustrates the hydraulic circuits used in propelling the vehicle, there is illustrated an internal combustion engine 9 which drives two hydraulic pumps 10a and 10b of the infinitely variable delivery type. In addition, the hydraulic delivery pumps 10a and 10b are also reversible. Control of the delivery of the pumps and reversal of the delivery direction of the pumps can be obtained by horizontally pivoting wobble plates 11 in a manner known per se. Any other hydraulic pump whose delivery is variable and can be controlled can also be used in these hydraulic systems.

The pivoting of the wobble plates 11 to control the delivery of the pumps is effected by two hydraulically actuated adjusting pistons 12 and 13 each of which is spring-loaded by springs 14 and 15 and is positioned in cylinders 16 and 17. The tension of the springs 14 and 15 can be adjusted by positioning the plates 18 and 19, respectively, by means of set or adjusting screws 20 and 21.

In addition, pump 10b is provided with a spring 22 which is positioned to assure that the wobble plate will not remain in its zero position in the event no hydraulic fluid or equal quantities of hydraulic fluid are admitted to the control pistons 12 and 13 of the delivery pump 10a.

When the vehicle is moving in the forward direction, the delivery pump 10a supplies hydraulic fluid through a supply conduit 23 to the parallel connected hydraulic motors 24 and 25. The hydraulic fluid is then discharged from the hydraulic motors 24 and 25 through discharge lines 26 and 27 which return the hydraulic fluid through return line 28 back to the delivery pump 10a.

The hydraulic supply line 23 is connected to the head end of the control cylinder 14 through hydraulic line 29 and the return line 28 is connected to the head end of the control cylinder 15 through hydraulic line 30. The difference in pressure between the supply line 23 and the return line 28 determines the angle at which the wobble plate 11 operates and thus adjusts the delivery of the pump 10a. The delivery of the pump 10a is regulated by manipulating the adjusting screws 20 and 21 so that the product of the pressure $p$ and the delivery quantity V remains constant. Since the relationship $N=pV$ represents the discharge of the delivery pump 10a, the pump can be readily controlled with respect to a constant delivery.

The direction of operation and hence of supply of the pump 10a can be reversed so as to reverse the direction of movement of the vehicle by so adjusting the screws 20 and 21 that the wobble plate 11 is moved to an angle beyond the zero position with respect to the angle as illustrated in FIGURE 7.

The above-described hydraulic arrangement represents one hydraulic circuit which produces the rotation of the wheels 5.

The other hydraulic circuit comprises the delivery pump 10b which is connected through a supply line 31 to the head end of the double-acting hydraulic cylinder 6a. A second conduit 32 also connects the delivery pump 10b with the head end of the hydraulic cylinder 6b. A hydraulic line 33 connects the crank ends of the hydraulic cylinders 6a and 6b.

The hydraulic line 31 is connected to the head end of a control cylinder 34 through a hydraulic line 35. The control cylinder 34 comprises a piston 36 which is biassed outwardly by a spring 37 acted upon by a control plate 38 and an adjusting or set screw 39.

The hydraulic line 32 is connected to the head end of a control cylinder 40 through a hydraulic line 41. The control cylinder 40 comprises a piston 42 which is urged outwardly by a spring 43 acted upon by a control plate 44 whose position is adjusted by an adjusting or set screw 45.

The hydraulic line 32 is connected through a line 46 to one end of a hydraulic servo cylinder 47. The servo cylinder comprises a pair of pistons 48 and 49 connected together by a rod 50. Springs 51 and 52 act upon the pistons 48 and 49 to urge the pistons to a central position. A hydraulic line 53 connects the other end of the servo cylinder 47 with the hydraulic line 31. The discharge lines 26 and 27 from the hydraulic motors 24 and 25 are also connected to the servo cylinder 47 and the return line 28 leads from a central connection of the hydraulic valve.

The two hydraulic systems as described above act in conjunction with each other in the following manner in order to propel the vehicle both by rotating of the wheels and by producing a "walking" effect of the rotating wheels. The delivery pump 10a supplies hydraulic fluid under pressure through the supply line 23 to the hydraulic motors 24 and 25 to rotate the wheels 5 in the forward direction. The spring 22 of the delivery pump 10b produces an oscillation in the wobble plate 11b so that hydraulic fluid under pressure is supplied to the hydraulic line 31. Accordingly, hydraulic fluid under pressure is admitted to the head end of the hydraulic cylinder 6a while simultaneously therewith hydraulic fluid is admitted under pressure through the line 53 to act against the piston 49 so that the piston 49 is moved in the position as shown in FIGURE 7 to block the discharge line 26 from the hydraulic motor 24. As a result, the rotation of the wheel 5a is retarded and its vertical support and the wheel 5a are moved rearwardly or reverted so as to propel the vehicle in the forward direction as indicated by the arrow 54.

Simultaneous with the reverting movement of the wheel 5a the wheel 5b is advanced with respect to the body of the vehicle as a result of being driven by the hydraulic motor 25. This advancing movement of the wheel 5b transmits a force onto the body of the vehicle through the cylinder 6b. An oil pressure is thereby created in the head end of the cylinder 6b which pressure is transmitted through the hydraulic line 32 back to the delivery pump 10b. The difference in pressures between the hydraulic lines 41 and 35 controls the delivery of the pump 10b so that the delivery thereof remains constant.

At a predetermined difference in pressure between the two control lines 35 and 41 the tilting angle of the wobble plate 11b can be adjusted by the adjusting screws 39 and 45.

The hydraulic pressure in the control line 41 and in the cylinder 6b is produced by the driving of the hydraulic motor 25 by means of the hydraulic fluid delivered from delivery pump 10a. This pressure will increase upon the increase in the delivery of the pump 10a whose delivery can also be adjusted by adjusting screws 20 and 21. If, for example, the supplied pressure in the supply line 23 is increased as a result of adjusting the adjusting screws 20 and 21 of the delivery pump 10a, the hydraulic motor 25 will then rotate more rapidly so as to exert a greater force onto the body of the vehicle through the cylinder 6b which will simultaneously result in an increased pressure in the hydraulic line 32 and also in the control lines 29 and 41. This increase in pressure now adjusts the delivery pump 10a to a reduced delivery through the control conduit 29 while the pump 10b is simultaneously adjusted to an increased delivery through the control conduit 41. Consequently, the two hydraulic circuits influence and control themselves mutually. By adjusting the adjusting screws of the two delivery pumps 10a and 10b it is possible to regulate a constant total propulsion output for the two delivery pumps as well as to selectively distribute the total power upon the two hydraulic circuits.

When the piston in the cylinder 6a reaches its end position the hydraulic pressure in the lines 31 and 35 will increase considerably while simultaneously the piston in cylinder 6b will reach its terminal position, whereby the pressure in conduits 32 and 41 will be virtually 0. This resulting substantial difference in pressures in the control conduits 35 and 41 immediately regulates the delivery pump 10b to a zero discharge. Since elastic energy has accordingly accumulated in the spring 22, the spring will pass through its zero position so that the delivery pump 10b is reversed and this delivery pump now acts oppositely to the operation thereof as described above. This opposite action will produce a working stroke in the hydraulic cylinder 6b instead of the hydraulic cylinder 6a as described previously.

The interconnecting hydraulic line 33 between the hydraulic cylinders 6a and 6b transfers hydraulic fluid from the crank end of one cylinder to the crank end of the other cylinder. This flow of hydraulic fluid does not influence the forward movement of the vehicle. It is pointed out, however, that when the vehicle is moving in a rearward direction, the hydraulic pressure from the cylinder 6a is transferred to the cylinder 6b through the conduit 33. Thus, the hydraulic pressure in the conduit 33 is produced by the pump 10b through the hydraulic line 31, and by the hydraulic motor 24 which is driven by the pump 10a wherein the force produced by the hydraulic motor is transmitted to the cylinder 6a. This is true since the direction of delivery of the pump 10a has been reversed by adjusting the screws 20 and 21 so that the functions of the hydraulic lines 46 and 53 are reversed whereby the cyclical retarding of rotation of the wheels is now accomplished in reverse order. The hydraulic pressure in the conduit 33 now produces a force against the piston in the cylinder 6b so that the body of the vehicle is now moved in the reverse direction with respect to the retarded wheel which is driven by the hydraulic motor 25.

It may be desired for some applications to eliminate the reverse movement of the vehicle when the vehicle is simultaneously being driven by the cylinders 6a and 6b. In this event single-acting cylinders could be substituted for the double-acting cylinders 6a and 6b. Should the vehicle be then driven in the reverse direction, the single-acting cylinders would be mechanically locked by means of the hydraulic motors 24 and 25. When double-acting cylinders are employed in the vehicle and the vehicle is to be driven in the reverse direction only by the action of the hydraulic motors 24 and 25, the hydraulic fluid contained in the crank ends of the cylinders will then function as a sealing liquid so that no mechanical locking device will be necessary for cylinders 6a and 6b.

In order to compensate for any leakage of hydraulic fluid and in order to maintain a minimum pressure in the hydraulic conduits, these conduits are connected through check valves to a small supply pump which makes up hydraulic fluid leakage. In addition, all of the hydraulic conduits are provided with pressure relief valves which prevent the building up of hydraulic pressure beyond a safe maximum. In order to clarify the drawings, these devices have not been illustrated in FIGURE 7.

When the pump 10b and the cylinders 6a and 6b are not used for driving the vehicle in a "walking" action, the pump and cylinders can be used for positioning the wheels to adjust the position of the vehicle body with respect to the road surface. This is particularly desirable when the vehicle is being driven on a steeply inclined surface. By maintaining the vehicle in a substantially horizontal position, the risk of the vehicle tipping over is considerably decreased and the load on the wheels is uniformly distributed. Thus, particularly in various agricultural machines better working conditions are obtained.

The automatic control of the horizontal positioning of the vehicle body can be obtained by a device as illustrated in FIGURE 8. This slope control device comprises a cylindrical casing 55 within which is rotatably mounted a valve member 56. The valve member has an axially extending arm 57 to which is attached a rod 58 upon the end of which is mounted a weight 59. When this device is mounted in a vehicle, the weight 59 is free to hang in a vertical position so that if the vehicle is on an angle, the vertical positioning of the weight will cause a rotation of the valve member 56. The rotation of this valve member can be used to control the delivery pump 10b and the position of the pistons in the cylinders 6a and 6b which adjusts the attitude of the vehicle body by pivoting the vertical supports 3 to angles whereby the vehicle body is in a horizontal position.

The cylinders 6a and 6b can be so connected that in one end position of their pistons the maximum inclined position of the vehicle is produced and the other end position corresponds to a horizontal positioning of the vehicle.

The slope control device is assembled in the hydraulic circuit shown in FIGURE 7 by disconnecting the control lines 35 and 41 from the conduits 31 and 32 and connecting them to the slope control device in the manner as shown in FIGURE 8. The control conduits 46 and 53 are closed. Hydraulic fluid under a constant pressure is supplied to the slope control device through the conduits 60 and 61.

When the vehicle is in an inclined position, the valve member 56 will rotate so as to connect the conduits 60 and 41 together and also to connect the conduits 41 and 62. As a result, the constant pressure hydraulic fluid entering through conduit 60 will adjust the delivery pump 10b to its delivery position through the conduit 41. As a result, hydraulic fluid will be supplied, for example, to cylinder 6a and simultaneously oil will be discharged from cylinder 6b and this will continue until the vehicle body is again in its horizontal position and the pendulum weight 59 is in its zero or vertical position.

The arrangement by which the vehicle is steered is illustrated in FIGURES 9 and 10. This steering arrangement comprises a crank lever 63 which is pivotally mounted at 64 and has a longer crank arm 65 and a shorter crank arm 66. The shorter crank arm 66 is connected to the steering control through a rod 67.

The other crank arm 65 is connected to a ball end 68 of a steering connecting rod 69 whose other ball end 70 is connected to a steering arm 71 which extends outwardly from a vertical support 3. The ball end 68 is positioned on the horizontal axis of the horizontal axle 2. The other ball end 70 moves in a circular path the plane of which is parallel with respect to the pivoting plane of the vertical supports 3. Thus, the steering connecting rod 69 describes a cone when the vertical supports 3 are pivoted about the horizontal axis 72 of the axle 2. As a result of the described movement of the steering connecting rod 69 there will be no steering locking of the wheels when the vertical supports 3 are pivoted. In addition, during the steering of the wheels, the ball end 68 will move only slightly out of the center of the horizontal axis 72 when the crank lever 63 pivots about its pivot point 64. As a result, the steering error occurring at a steering lock can be kept at a minimum.

Figure 11:
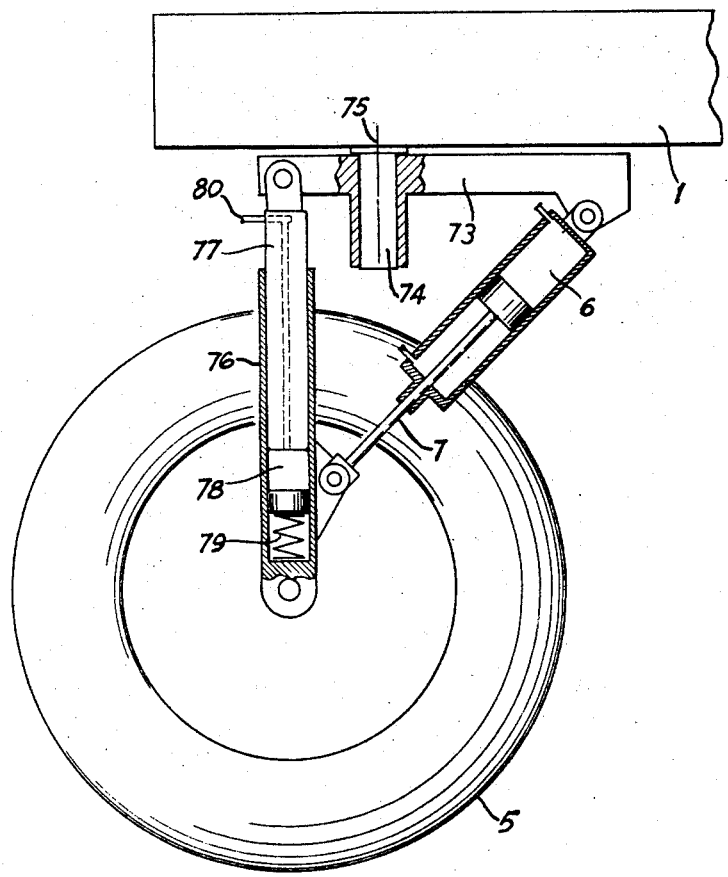
FIGURE 11 is a side elevational view of a modified structure for mounting the wheel and hydraulic cylinder onto the vehicle body.

A modification of this steering arrangement is illustrated in FIGURE 11 wherein a frame 73 is mounted on a shaft 74 extending from the vehicle body 1 and in such a manner so as to pivot about a vertical axis 75.

In this modification the vertical support for the wheel 5 comprises a hydraulic cylinder 76 having a piston 77 therein at the head end of which is an oil chamber 78. In addition, there is a spring element 79 positioned within the cylinder 76. The hydraulic cylinder is of the single-acting type and is connected to a source of hydraulic pressure under pressure through hydraulic line 80.

The working cylinder 6 has one end connected to the frame 73 and has its piston rod connected to the hydraulic cylinder 76 which is a component of the vertical support of the wheel 5.

Since in this modification the vertical support and the working cylinder 6 are mounted on a single unit 73 it is apparent that the walking motion of the wheels can be transmitted to the wheels in the direction of movement of the vehicle when the wheels are steered by pivoting the frame 73. Thus, the full propulsion force may be maintained on the vehicle even when the vehicle is proceeding around a curve.

By forming the vertical support for the wheel as a hydraulic cylinder the vertical position of the wheel with respect to the vehicle body may be selectively adjusted so as to maintain the vehicle body in a horizontal position or to distribute the vehicle load in a predetermined manner upon all of the vehicle wheels. Further, if desired, one wheel may be raised to such a height that the wheel does not support any of the vehicle weight.

The spring 79 in the hydraulic cylinder 76 functions as a hydraulic accumulator so as to maintain the shock-absorbing properties of the vertical support regardless of the vertical position of the wheel.

Figure 12:
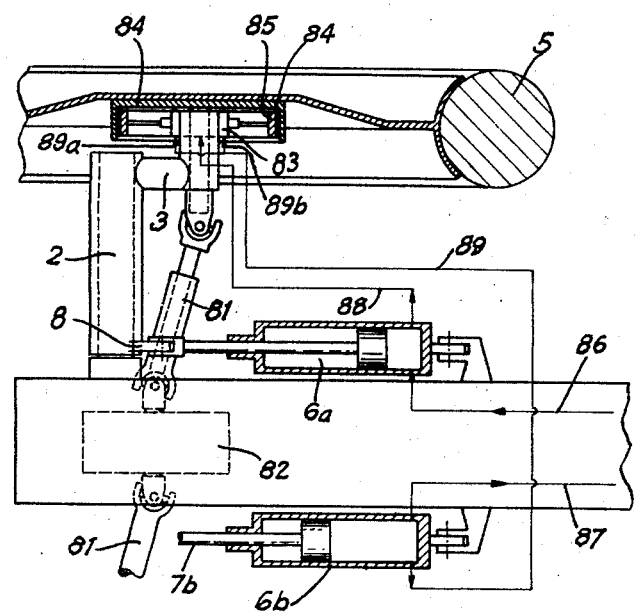
FIGURE 12 is a top plan view of a portion of the vehicle of this invention wherein a mechanical drive is provided for rotating the wheels.

Proceeding next to FIGURE 12 there is shown a modification of the present invention wherein the wheels 5 are rotated mechanically. In this modification the wheels are rotated by drive shafts 81 which are driven through a differential gear 82. Thus, the wheels are rotated mechanically and at the same time the wheels are advanced and reverted to obtain a "walking" action superimposed on the rotation of the wheels. The structure to obtain the "walking" action is the same as that described and illustrated in connection with FIGURE 7.

Figure 13:
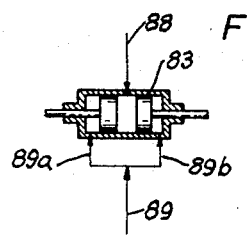
FIGURE 13 shows a servo-valve for actuating the braking of the wheels in FIGURE 12.

In addition, FIGURE 12 discloses an arrangement for the cylical retarding of the rotation of the wheel. When hydraulic fluid under pressure is admitted to the cylinder 6a through line 86, the hydraulic fluid returns from the other cylinder 6b through return line 87 to the delivery pump under some pressure since a pressure is exerted on this return oil through the piston rod 7b and piston in cylinder 6b by means of the returning movement of the wheel 5b. The oil pressure returning from the cylinder 6b is always less than the pressure of the hydraulic fluid being supplied to the cylinder 6a. This difference in pressure can be utilized for actuating a hydraulic brake mounted on the wheels. This hydraulic braking brake can comprise a hydraulic cylinder 83 the actuation of which by hydraulic pressure in line 88 simultaneously with pressure supplied through line 86 presses brake shoes 84 against a brake drum 85. The hydraulic braking cylinder and connecting hydraulic lines are illustrated in FIGURE 13. The cylinder 83 also has hydraulic lines 89a and 89b leading from the crank ends of the double piston assembly and connect to line 89 which leads to the crank end of the piston 6b. This arrangement provides for a simultaneous retarding or braking of the wheel to whose cylinder hydraulic fluid under pressure is admitted to return the wheel, while the hydraulic brake of the advancing wheel is released by the difference in the oil pressures.

Figure 3:
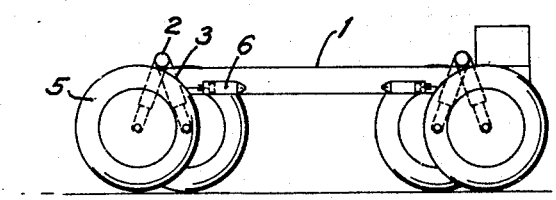
FIGURE 3 is a side elevational view of a four-wheeled vehicle having a four-wheeled drive.
Figure 4:
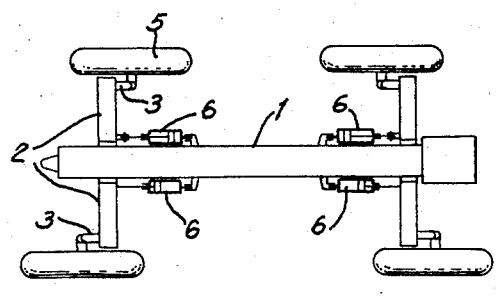
FIGURE 4 is a top plan view of the vehicle illustrated in FIGURE 3.

In FIGURES 3 and 4 the four-wheeled drive vehicle illustrated therein is also propelled by a simultaneous rotation of the wheels accompanied by a cyclical reverting and advancing of the wheels. In this arrangement diagonally opposite wheels are advanced and the other diagonally opposite wheels are reverted. In order to compensate for rough cross-country surfaces, one of the axles can be pivotally connected with the vehicle body. However, this pivotal connection of the axle will not be necessary in the event hydraulic cylinders are built into the vertical supports in order to vertically position the wheels.

Figure 5:
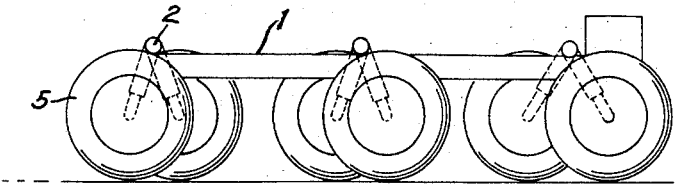
FIGURE 5 is a side elevational view of a three-axle six-wheeled vehicle having drive in all six wheels.
Figure 6:
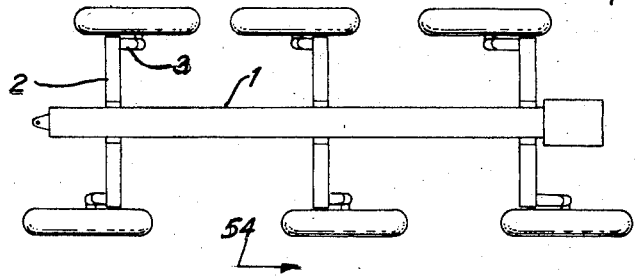
FIGURE 6 is a top plan view of the vehicle shown in FIGURE 5.

Proceeding next to FIGURES 5 and 6 there is shown a three-axle six-wheeled vehicle wherein the drive is to all six wheels. In this modification one wheel on each side of the vehicle is advanced and at the same time the advancing wheel is either partially or completely free from the vertical load of the vehicle.

As a result, the other two wheels are retarded or braked and exert propulsion forces on the body of the vehicle in a "walking" action as described above. The weight on the wheel is removed by employing hydraulic cylinders in the vertical supports so that the wheel may be vertically lifted out of contact with the road surface. Thus, this arrangement provides a true walking action in that no weight is positioned on the wheel which is advancing or stepping forwardly.

The steering arrangement illustrated in FIGURE 11 is preferably used with the modification illustrated in FIGURES 5 and 6.

It is pointed out that when the wheels are rotated through a hydraulic drive it is necessary to brake one of the wheels during the advancing step such as by connecting the hydraulic wheel motors in parallel. When the differential gear drive of FIGURE 12 is used, however, no such provision is necessary since the nature of the differential gear ensures that the speed of one wheel will be advanced when the speed of the other wheel is decreased. As a result, the vehicle will be propelled at a speed equaling that speed which will be obtained in the event both wheels were rotated simultaneously at the same speed.

Other forms of structure may be used for retarding the rotation of the wheel either mechanically or hydraulically. Mechanical structures would include free wheel connections or locking pawls.

Thus it can be seen that the present invention provides a motor vehicle which can be propelled by the simultaneous action of two propulsion systems. In addition, the simple yet effective hydraulic circuit has been disclosed to provide an effective propulsion of the vehicle by a "walking" action. The propulsion effect of this walking action is considerably increased by a braking of the rotation of the wheel which is being reverted or moved in a rearward direction so as to propel the vehicle by a step-like motion.

It will be understood that this invention is susceptible to modification in order to adapt it to different usages and conditions and, accordingly, it is desired to comprehend such modifications within this invention as may fall within the scope of the appended claims.

What is claimed as this invention is:

1. A motor vehicle comprising a body supported on a plurality of pairs of wheels, means for rotating the wheels of one of said pairs to propel said vehicle, means for concurrently advancing and returning said wheels with respect to said body while said wheels are rotating, and means for decreasing the rotary speed of each of said wheels during the return movement thereof.

2. A motor vehicle comprising a body supported on a plurality of pairs of wheels, means for rotating the wheels of one of said pairs to propel said vehicle, and means for concurrently advancing and returning said wheels with respect to said body while said wheels are rotating, there being brakes on said wheels, and means for actuating each of said brakes to decrease the speed of the respective wheel during the return movement of said wheel.

3. A motor vehicle comprising a body supported on a plurality of pairs of wheels, means for rotating the wheels of one of said pairs to propel said vehicle, means for concurrently advancing and returning said wheels with respect to said body while said wheels are rotating, and means for decreasing the rotary speed of each of said wheels during the return movement thereof, said rotary speed decreasing means being actuated by the advancing and return movements of said wheels.

4. A motor vehicle comprising a body, a pair of vertical supports pivotally mounted on said body, wheels mounted on said vertical supports, means for rotating said wheels to propel the vehicle, double-acting fluid pressure cylinders each having a piston connected to one of said vertical supports, and a fluid pressure system connected to said cylinders to cyclically actuate the cylinders whereby said vertical supports are cyclically pivoted on their horizontal axes to advance and return the wheels with respect to said body.

5. A motor vehicle comprising a body, a pair of vertical supports pivotally mounted on said body, wheels mounted on said vertical supports, means for rotating said wheels to propel the vehicle, double-acting fluid pressure cylinders each having a piston connected to one of said vertical supports, a fluid pressure system connected to said cylinders to cyclically actuate the cylinders whereby said vertical supports are cyclically pivoted on their horizontal axes to advance and return the wheels with respect to said body, fluid pressure brakes on said wheels, and means actuated by said fluid pressure cylinders and connected to said brakes for operating said brakes to decrease the rotary speed of the wheels while a wheel is being returned.

6. A motor vehicle comprising a body supported on a plurality of pairs of wheels, fluid pressure means for rotating the wheels of one of said pairs to propel said vehicle, means for concurrently advancing and returning said wheels with respect to said body while said wheels are rotating, and means for stopping the return of the fluid pressure medium from said rotating means of a wheel which is being returned.

7. A motor vehicle comprising a body supported on a plurality of pairs of wheels, fluid pressure means for rotating the wheels of one of said pairs to propel said vehicle, said fluid pressure means being connected in parallel to a source of fluid pressure, means for concurrently advancing and returning said wheels with respect to said body while said wheels are rotating, and means for braking the rotary speed of a wheel when that wheel is being returned whereby the other wheel is supplied with an increased flow of fluid pressure medium to increase the speed of rotation thereof.

8. A motor vehicle comprising a body, a pair of vertical supports pivotally mounted on said body, wheels mounted on said vertical supports, fluid pressure means for rotating said wheels to propel the vehicle, a first fluid pressure circuit for operating said fluid pressure rotating means, double-acting fluid pressure cylinders each having a piston connected to one of said vertical supports, and a second fluid pressure circuit connected to said cylinders to cyclically actuate the cylinders whereby said vertical supports are cyclically pivoted on their horizontal axes to advance and return the wheels with respect to said body.

9. A motor vehicle comprising a body, a pair of vertical supports pivotally mounted on said body, wheels mounted on said vertical supports, fluid pressure means for rotating said wheels to propel the vehicle, a first fluid pressure circuit including an infinitely variable pressure pump for operating said fluid pressure rotating means, double-acting fluid pressure cylinders each having a piston connected to one of said vertical supports, a second fluid pressure circuit including an infinitely variable pressure pump connected to said cylinders to cyclically actuate the cylinders whereby said vertical supports are cyclically pivoted on their horizontal axes to advance and return the wheels with respect to said body, means for braking the rotary speed of a wheel when that wheel is being returned so that the other wheel is supplied with an increased flow of fluid pressure medium, and means connected to said fluid pressure circuits and said braking means and said cylinders for cyclically braking said wheels and for cyclically reversing the pressure stroke of said cylinders.

10. A motor vehicle comprising a body, a pair of vertical supports pivotally mounted on said body, wheels mounted on said vertical supports, means for rotating said wheels to propel the vehicle, double-acting fluid pressure cylinders each having a piston connected to one of said vertical supports, a fluid pressure system connected to said cylinders to cyclically actuate the cylinders whereby said vertical supports are cyclically pivoted on their horizontal axes to advance and return the wheels with respect to said body, and means connected to said fluid pressure system for positioning said vertical supports in a predetermined position whereby the wheel base and center of gravity of the vehicle can be adjusted.

11. A motor vehicle comprising a body, a pair of vertical supports pivotally mounted on said body, wheels mounted on said vertical supports, means for rotating said wheels to propel the vehicle, double-acting fluid pressure cylinders each having a piston connected to one of said vertical supports, a fluid pressure system connected to said cylinders to cyclically actuate the cylinders whereby said vertical supports are cyclically pivoted on their horizontal axes to advance and return the wheels with respect to said body, and fluid pressure cylinders in said vertical supports to adjust the vertical position of said wheels with respect to said body.

12. A motor vehicle comprising a body, a pair of vertical supports pivotally mounted on said body, wheels mounted on said vertical supports, means for rotating said wheels to propel the vehicle, double-acting fluid pressure cylinders each having a piston connected to one of said vertical supports, a fluid pressure system connected to said cylinders to cyclically actuate the cylinders whereby said vertical supports are cyclically pivoted on their horizontal axes to advance and return the wheels with respect to said body, and steering means for pivoting said vertical supports about their vertical axes and including a steering connecting rod having one end thereof positioned at the horizontal pivot axis of said vertical supports.

13. A motor vehicle comprising a body, a pair of frames mounted on opposite sides of said body for pivotal movement about vertical axes, vertical supports pivotally mounted on said frames for pivotal movement about horizontal axes, wheels mounted on said vertical supports, means for rotating said wheels to propel the vehicle, double-acting fluid pressure cylinders mounted on said frames with each cylinder having a piston connected to the respective vertical support, a fluid pressure system connected to said cylinders to cyclically actuate the cylinders whereby said vertical supports are cyclically pivoted on their horizontal axes to advance and return the wheels with respect to said body, and means for selectively pivoting said frames about their vertical axes to steer the vehicle.

References Cited in the file of this patent

UNITED STATES PATENTS

| | | |
|---|---|---|
| 675,388 | Keating | June 4, 1901 |
| 795,664 | Ucker | July 25, 1905 |
| 1,043,574 | Ehrlich | Nov. 5, 1912 |
| 2,393,324 | Joy | Jan. 22, 1946 |
| 2,419,807 | Wilcox | Apr. 29, 1947 |
| 3,016,966 | Hansen | Jan. 16, 1962 |